(12) United States Patent
Binyamin (10) Patent No.: US 11,875,938 B1
(45) Date of Patent: Jan. 16, 2024

(54) SYSTEMS AND METHODS FOR GENERATING MOTION

(71) Applicant: Shuki Binyamin, Los Altos, CA (US)

(72) Inventor: Shuki Binyamin, Los Altos, CA (US)

( * ) Notice: Subject to any disclaimer, the term of this patent is extended or adjusted under 35 U.S.C. 154(b) by 0 days.

(21) Appl. No.: 18/215,442

(22) Filed: Jun. 28, 2023

Related U.S. Application Data (60) Provisional application No. 63/356,919, filed on Jun. 29, 2022.

(51) Int. Cl.
| | | |
|---|---|---|
| *H01H 47/00* | (2006.01) | |
| *H01F 7/06* | (2006.01) | |
| *H01F 7/20* | (2006.01) | |
| *B60K 8/00* | (2006.01) | |

(52) U.S. Cl.
CPC ............... *H01F 7/064* (2013.01); *H01F 7/20* (2013.01); *B60K 8/00* (2013.01)

(58) Field of Classification Search
None
See application file for complete search history.

(56) References Cited

U.S. PATENT DOCUMENTS

| | | | | |
|---|---|---|---|---|
| 3,574,485 | A * | 4/1971 | Herman, Jr. ........... | B22D 27/02 417/50 |
| 3,813,067 | A * | 5/1974 | Mork ....................... | B64G 1/36 244/165 |
| 4,316,394 | A * | 2/1982 | Dohogne ................ | G01C 19/28 310/90.5 |
| 5,483,863 | A | 1/1996 | Dreizin | |
| 2006/0112848 | A1 | 6/2006 | St. Clair | |
| 2016/0006329 | A1* | 1/2016 | Ruan ....................... | H02K 26/00 310/38 |
| 2017/0081049 | A1* | 3/2017 | Yew ........................ | B64G 1/283 |
| 2017/0343314 | A1 | 11/2017 | Hartman et al. | |
| 2021/0099066 | A1 | 4/2021 | Hartman et al. | |

FOREIGN PATENT DOCUMENTS

WO        2023009837 A1     2/2023

\* cited by examiner

*Primary Examiner* — Stephen W Jackson
(74) *Attorney, Agent, or Firm* — Sheppard, Mullin, Richter & Hampton LLP (57) ABSTRACT

A system comprises a hollow body forming a closed loop channel; one or more electromagnetic coils on the hollow body; a free-moving magnetic object in the channel; and a control system configured to control the one or more electromagnetic coils to cause the free-moving magnetic object to rotate within the channel during an acceleration phase and to cause one or more magnetic collisions with at least one of the one or more electromagnetic coils during an energy transfer phase, the one or more magnetic collisions causing a directional movement of the system.

19 Claims, 10 Drawing Sheets

SYSTEMS AND METHODS FOR GENERATING MOTION

PRIORITY CLAIM

This application claims benefit of and hereby incorporates by reference provisional patent application Ser. No. 63/356,919, entitled "Systems and Methods for Generating Motion," filed on Jun. 29, 2022, by inventor Shuki Binyamin.

TECHNICAL FIELD

This invention relates generally to engines, and more particularly provides systems and methods for generating motion of a vehicle.

BACKGROUND

Transportation is critical in our modern economy. In response, modern society has developed many types of vehicles to support transportation of goods, people, food, etc. For transportation on ground, these vehicles include cars, trucks, buses, motorcycles, trains, etc. For transportation on and in water, these vehicles include boats, ships, submarines, etc. For transportation in air, these vehicles include planes, helicopters, drones, etc. For transportation in outer space, these vehicles include rockets, spacecraft, satellites, spacesuits, etc.

Each vehicle has a propulsion source and steering mechanism to cause directed motion. Some vehicles, such as a train, monorail, etc., are capable of moving in only one dimension (forwards and backwards). Some vehicles, such as a car, truck, bus, motorcycle, boat, etc., are capable of moving in only two dimensions on a surface (forwards, backwards, left and right). Some vehicles, such as a plane, drone, helicopter, submarine, spacecraft, etc., can maneuver in three dimensions (forwards, backwards, left, right, up and down).

Each of these vehicles has a different type of propulsion source to enable its directed motion. Some use an internal combustion engine powered by liquid or gaseous fuel and steering systems to maneuver the vehicle. Some use spinning propellers/turbines that cooperate with air or water and fins to maneuver the vehicle. Some carry propellants, which must be expelled outwards in different directions to maneuver the vehicle.

Each of these alternatives has drawbacks. A safer, lighter and more-controlled propulsion source, including one that does not require air or water, including one that does not require propellants, would be desirable.

SUMMARY

Embodiments of the present invention provide an engine capable of converting one or more forms of energy to mechanical energy without the need for a medium such as air, friction, thrust or propellants. In some embodiments, the engine converts angular momentum to linear momentum to generate motion, whether the intended motion is one dimensional, two dimensional or three dimensional. Embodiments of the engine can operate on the surface of earth, in space where there is no air/atmosphere, and/or in water.

In some embodiments, the engine operates to convert angular momentum to linear momentum via collisions between two objects. In an example embodiment, the engine may cause a free-moving object to spin in a toroidal channel to generate angular momentum. The engine may then cause the free-moving object to collide or interact with a target object at one or more specific times and/or at one or more specific locations in order to transfer at least some of the momentum and kinetic energy of the free-moving object to the target object. The target object receives the momentum and kinetic energy and moves in a direction perpendicular to the radius of the angular momentum of the free-moving object. In some embodiments, the engine may comprise more than one free-moving object. In some embodiments, the engine may comprise more than one target object. In some embodiments, one or more engines may be combined to move a vehicle, such as a car, boat, spacecraft, train, drone, container, etc.

In some embodiments, the free-moving object and the target object need to be in the same system. In some embodiments, the engine needs to cause repeated collisions and thus repeated transfers of momentum and energy. In some embodiments, the engine needs to have an external power source to continue to add kinetic energy to the free-moving object because friction, energy loss due to the collisions, increased kinetic energy of the whole system and other energy losses consume power. In some embodiments, the free-moving object needs to be mechanically "disconnected" from the energy source that feeds it. In some embodiments, the energy must be provided in a timely manner. In some embodiments, the center of the mass of the free-moving object needs to be in a different location than the center of the mass of the engine. In some embodiments, the center of the mass of the free-moving object needs to be in a different location than the center of the mass of the vehicle.

In some embodiments, the present invention provides a system, comprising a hollow body forming a closed loop channel; one or more electromagnetic coils on the hollow body; a free-moving magnetic object in the closed loop channel; and a control system configured to control the one or more electromagnetic coils to cause the free-moving magnetic object to rotate within the closed loop channel during an acceleration phase and to cause one or more magnetic collisions with at least one of the one or more electromagnetic coils during an energy transfer phase, the one or more magnetic collisions causing a directional movement of the system.

The closed loop channel may be toroidal. The hollow body may be toroidal. The one or more electromagnetic coils may include four electromagnetic coils equally spaced apart. The control system may be configured to control an interacting electromagnetic coil of the one or more electromagnetic coils during the acceleration phase to attract the free-moving magnetic object as the free-moving magnetic object is approaching the interacting electromagnetic coil and/or to repel the free-moving magnetic object as the free-moving magnetic object is departing the interacting electromagnetic coil. The control system may be configured to control the interacting electromagnetic coil to deactivate when the free-moving magnetic object is at or almost at the center of the interacting electromagnetic coil. The control system may be configured to control an interacting electromagnetic coil of the one or more electromagnetic coils during the collision phase to repel the free-moving magnetic object as the free-moving magnetic object is approaching the interacting electromagnetic coil and/or to attract the free-moving magnetic object as the free-moving magnetic object is departing the interacting electromagnetic coil. The control system may be configured not to deactivate the interacting electromagnetic coil when the free-moving magnetic object is at or almost at the center of the interacting electromagnetic coil. The system may further comprise a second free-moving magnetic object.

In some embodiments, the present invention provides a vehicle, comprising a first system, including a first hollow body forming a first closed loop channel; one or more first electromagnetic coils on the first hollow body; and a first free-moving magnetic object in the first closed loop channel; a second system including a second hollow body forming a second closed loop channel; one or more second electromagnetic coils on the second hollow body; and a second free-moving magnetic object in the second closed loop channel; and a control system configured to control the one or more first electromagnetic coils to cause the first free-moving magnetic object to rotate within the first closed loop channel during a first acceleration phase and to cause one or more first magnetic collisions with at least one of the one or more first electromagnetic coils during a first energy transfer phase, the one or more first magnetic collisions causing a first directional movement, the control system further configured to control the one or more second electromagnetic coils to cause the second free-moving magnetic object to rotate within the second closed loop channel during a second acceleration phase and to cause one or more second magnetic collisions with at least one of the one or more second electromagnetic coils during a second energy transfer phase, the one or more second magnetic collisions causing a second directional movement, vehicle movement being based on the first directional movement and the second directional movement.

The vehicle may be configured to move in one dimension, in two dimensions on a surface, or in three dimensions. Each of the first closed loop channel and the second closed loop channel may be toroidal. The one or more first electromagnetic coils may include four first electromagnetic coils equally spaced apart, and/or the one or more second electromagnetic coils may include four second electromagnetic coils equally spaced apart. The control system may be configured to control a first interacting electromagnetic coil of the one or more first electromagnetic coils during the first acceleration phase to attract the first free-moving magnetic object as the first free-moving magnetic object is approaching the first interacting electromagnetic coil and/or to repel the first free-moving magnetic object as the first free-moving magnetic object is departing the first interacting electromagnetic coil, and the control system may be configured to control a second interacting electromagnetic coil of the one or more second electromagnetic coils during the second acceleration phase to attract the second free-moving magnetic object as the second free-moving magnetic object is approaching the second interacting electromagnetic coil and/or to repel the second free-moving magnetic object as the second free-moving magnetic object is departing the second interacting electromagnetic coil. The control system may be configured to control a first interacting electromagnetic coil of the one or more first electromagnetic coils during the first collision phase to repel the first free-moving magnetic object as the first free-moving magnetic object is approaching the first interacting electromagnetic coil and/or to attract the first free-moving magnetic object as the first free-moving magnetic object is departing the first interacting electromagnetic coil, and the control system may be configured to control a second interacting electromagnetic coil of the one or more second electromagnetic coils during the second collision phase to repel the second free-moving magnetic object as the second free-moving magnetic object is approaching the second interacting electromagnetic coil and/or to attract the second free-moving magnetic object as the second free-moving magnetic object is departing the second interacting electromagnetic coil. The one or more first magnetic collisions may further cause a first rotational movement, the one or more second magnetic collisions may further cause a second rotational movement, and the second rotational movement may substantially cancel the first rotational movement.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Embodiments of the present invention provide an engine capable of converting one or more forms of energy to mechanical energy without the need for a medium such as air, friction, thrust or propellants. In some embodiments, the engine converts angular momentum to linear momentum to generate motion, whether the intended motion is one dimensional, two dimensional or three dimensional. Embodiments of the engine can operate on the surface of earth, in space where there is no air/atmosphere, and/or in water.

In some embodiments, the engine operates to convert angular momentum to linear momentum via interactions between two objects. In an example embodiment, the engine may cause a free-moving object with mass to spin in a toroidal channel to generate angular momentum. The engine may then cause the free-moving object to collide or interact with a target object at one or more specific times and/or at one or more specific locations in order to transfer at least some of the momentum and kinetic energy of the free-moving object to the target object. The target object receives the momentum and kinetic energy and moves in a direction perpendicular to the radius of the angular momentum of the free-moving object. In some embodiments, the engine may comprise more than one free-moving object. In some embodiments, the engine may comprise more than one target object. In some embodiments, one or more engines may be combined to move a vehicle, such as a car, boat, spacecraft, train, drone, container, etc. In some embodiments, the forces used to cause the free-moving object to spin in the toroidal channel may be magnetic forces, mechanical forces, collisional forces and/or other forces. In some embodiments, the forces used to cause the free-moving object to transfer energy to the target object may be magnetic forces, mechanical forces, frictional forces, collisional forces (elastic or inelastic), air resistance forces, and/or other forces.

In some embodiments, the free-moving object and the target object need to be in the same system. In some embodiments, the engine needs to cause repeated collisions and thus repeated transfers of momentum and energy. In some embodiments, the engine needs to have an external power source to continue to add kinetic energy to the free-moving object because friction, energy loss due to the collisions, increased kinetic energy of the whole system and other energy losses consume power. In some embodiments, the free-moving object needs to be mechanically "disconnected" from the energy source that feeds it. In some embodiments, the energy must be provided in a timely manner. In some embodiments, the center of the mass of the free-moving object needs to be in a different location than the center of the mass of the engine. In some embodiments, the center of the mass of the free-moving object needs to be in a different location than the center of the mass of the vehicle.

Figure 1:
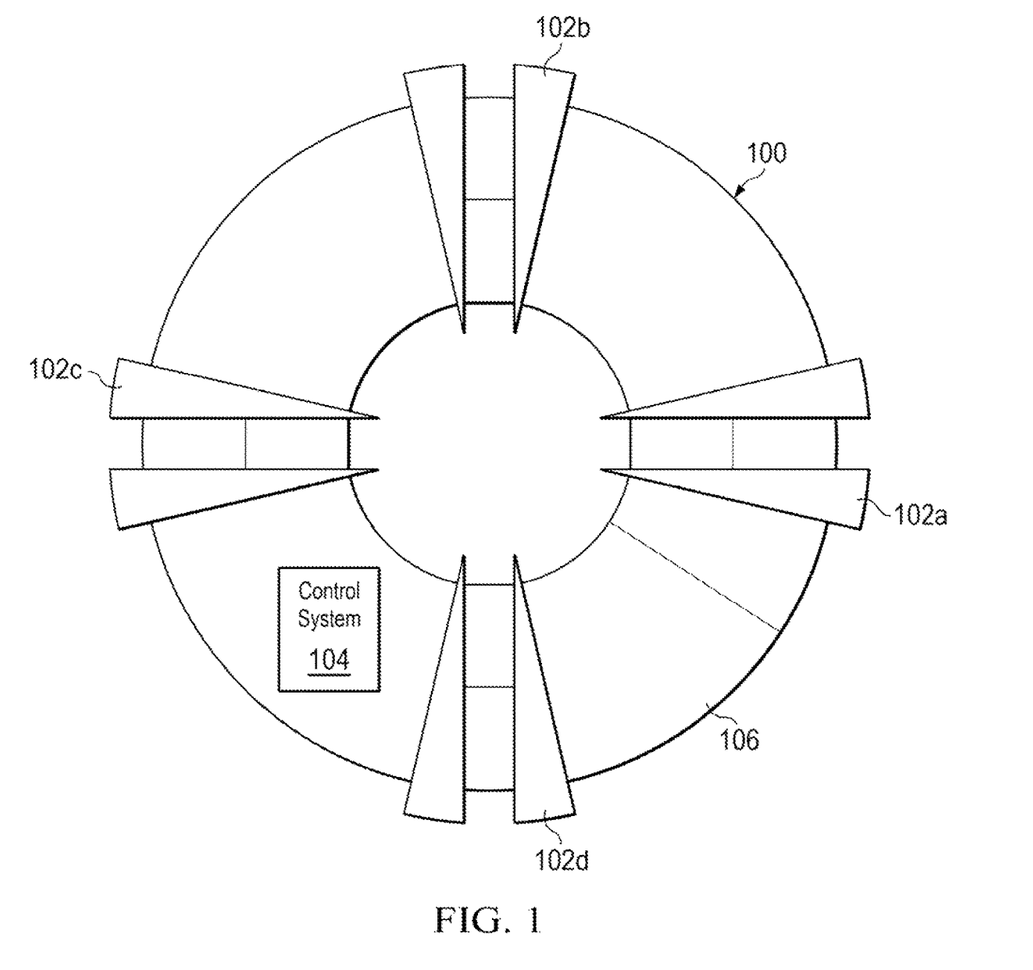
FIG. 1 illustrates a hollow toroidal system having four electromagnetic coils, in accordance with some embodiments of the present invention.

The following figures illustrate various embodiments that use magnetics to cause spin of a free-moving magnetic object and transfer momentum and kinetic energy to one or more target electromagnetic objects and thus to the vehicle:

FIG. 1 illustrates a hollow toroidal system 100 having four electromagnetic coils 102a-102d (each generally referred to as electromagnetic coil 102), a control system 104, a hollow toroidal body 106 with a toroidal channel contained therein (now shown) and a free-moving magnetic object (not shown) in the toroidal channel, in accordance with some embodiments of the present invention. During an acceleration phase, the control system 104 controls the magnetic polarities of the four coils 102a-102d in a manner to accelerate the spinning the free-moving magnetic object within the toroidal channel. During an energy transfer phase, the control system 104 controls the magnetic polarities of the four coils 102a-102d in a manner to transfer momentum and kinetic energy from the free-moving magnetic object to the system 100 itself. Although the system 100 is shown as having a toroidal shape, other closed loop shapes (looping with no terminations, such as an oval or FIG. 8) are also possible. In some embodiments, the channel shape may be different than the body shape. In some embodiments, the channel shape includes no sharp angles or sharp turns that will cause undesired momentum or kinetic energy transfers. Although the hollow toroidal system 100 is shown to include four electromagnetic coils 102, the number of electromagnetic coils 102 may be different and/or may be based on the specific needs of the vehicle. Although the hollow toroidal system 100 is shown to include four electromagnetic coils 102 equally spaced apart, the number and position of electromagnetic coils 102 may be different and/or may be based on the specific needs of the vehicle.

As indicated above, although the hollow toroidal system 100 is being described using magnetic forces, other forces to cause spin of the free-moving object and energy transfer to a target object may be used, additional or alternatively. For example, a spinning object such as a spinning wheel, instead of or in addition to the electromagnetic coils 102, can be used to accelerate the free-moving object in the hollow channel. During an acceleration phase, when the free-moving object reaches the location of the spinning object, the free-moving object will momentarily interact with the spinning object, and will be thrust forward, gaining momentum/energy from that interaction. Similarly, during an energy transfer phase, if the spinning object is controlled to spin more slowly than the speed of the free-moving object, or if the spinning object is controlled to stop spinning, or if the spinning object is controlled to spin in the opposite direction, the spinning object will cause a collision that will transfer momentum and kinetic energy to the spinning (target) object. The spinning object can be created by a smaller, conventional electric engine, that rotates the spinning object.

Figure 2:
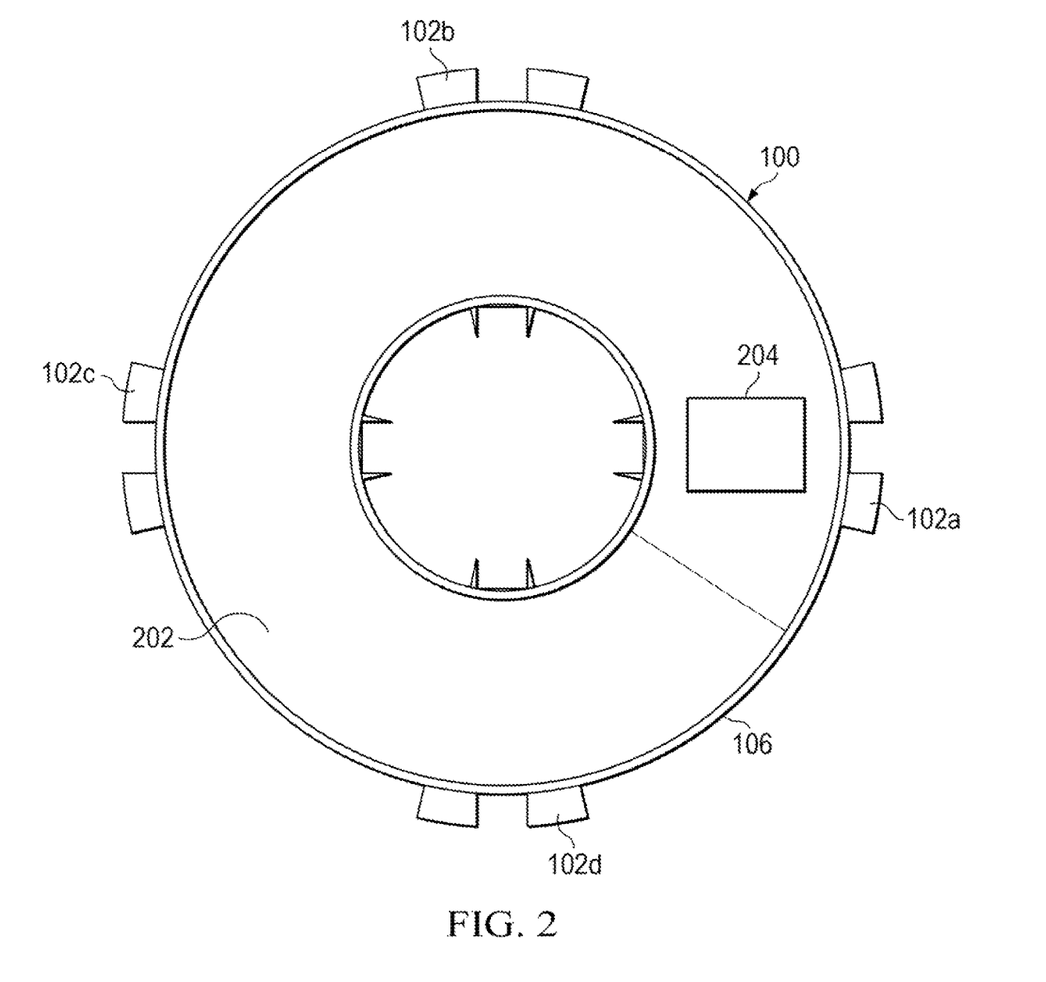
FIG. 2 illustrates a cross-sectional interior view of the hollow toroidal system having a free-moving magnetic object therein, in accordance with some embodiments of the present invention.

FIG. 2 illustrates a cross-sectional interior view of the hollow toroidal system 100, exposing the toroidal channel 202 and the free-moving magnetic object 204 therein, in accordance with some embodiments of the present invention.

During the acceleration phase, the control system 104 (shown in FIG. 1) controls the magnetic polarities of the electromagnetic coils 102a-102b in an acceleration pattern to cause the free-moving magnetic object 204 to spin within the toroidal channel 202. In some embodiments, the control system 104 controls the spin of the free-moving magnetic object 204 by controlling the magnetic polarities of each of the electromagnetic coils 102a-102d to draw and repel the free-moving magnetic object 204 in a cooperative pattern as the free-moving magnetic object 204 passes each electromagnetic coil 102a-102d, thereby causing the free-moving magnetic object 204 to accelerate within the toroidal channel 202. In some embodiments, to cause an acceleration, the control system 104 controls the interacting electromagnetic coil 102 to attract the free-moving magnetic object 204 as it approaches the interacting electromagnetic coil 102 and to repel the free-moving magnetic object 204 as it departs the interacting electromagnetic coil 102. In some embodiments, the control system 104 may deactivate the interacting electromagnetic coil 102 when or just before the free-moving magnetic object 204 reaches the middle of the interacting electromagnetic coil 102 to create maximum acceleration force.

During a momentum and kinetic energy transfer phase, the control system 104 controls the magnetic polarities of at least one of the electromagnetic coils 102a-102d in an energy transfer pattern to cause an energy transfer or "collision" with the interacting (in this case "blocking") electromagnetic coil 102a-102d. To effect the energy transfer, the control system 104 may control the "blocking" electromagnetic coils 102a-102d in a reverse pattern opposite of the acceleration pattern to transfer at least some of the momentum of the free-moving magnetic object 204 to the blocking electromagnetic coil 102 as the free-moving magnetic object 204 passes. In some embodiments, to cause a collision force, the control system 104 controls the blocking electromagnetic coil 102 to repel the free-moving magnetic object 204 as it approaches the blocking electromagnetic coil 102 and to attract the free-moving magnetic object 204 as it departs the blocking electromagnetic coil 102. In some embodiments, the control system 104 may not deactivate the blocking electromagnetic coil 102 when or before the free-moving magnetic object reaches the middle of the blocking electromagnetic coil 102 in order to create a maximum collision force. To effect the energy transfer in a desired direction, the control system 104 may select different ones of the electromagnetic coils 102a-102d at different times to cause collisions that transfer motion in the desired direction.

In some embodiments, the free-moving object may comprise a ferritic material (iron for example) instead or in addition to magnetic material. In an embodiment using ferritic material, there will be no option to repel the free-moving object. However, some embodiments may prefer a free-moving ferritic object to reduce cost and/or for other reasons involving factors such as weight, durability, availability of parts, and/or the like.

As indicated above, the control system 104 will control the magnetic polarities of the electromagnetic coils 102-*a*-102d according to an interaction pattern to cause either an acceleration force or directional collision force. In some embodiments, the control system 104 will cause the interacting electromagnetic coil 102 to be supplied with electric current to create a magnetic field as described in Lenz law. The control system 104 may control the activation, deactivation and polarity of the electric current on each of the electromagnetic coils 102a-102d based on the location of the free-moving magnetic object 204 and based on the behaviors wanted. At certain locations and at various times, the control system 104 will cause the free-moving magnetic object 204 to be attracted to the electromagnetic coil 102, to be repelled by the electromagnetic coil 102, and/or to be held forcibly by the electromagnetic coil 102. The pattern (location, time, duration, polarity, etc.) will cause directional forces to be applied on the free-moving magnetic object 204 and on the hollow toroidal system 100. The direction and magnitude of these directional forces will define the direction and speed of the vehicle, e.g., the direction and speed of a vehicle on tracks, the direction and speed of a vehicle with wheels, the levitation of the vehicle, the direction and speed of a vehicle in three-dimensional space, etc.

Figure 3:
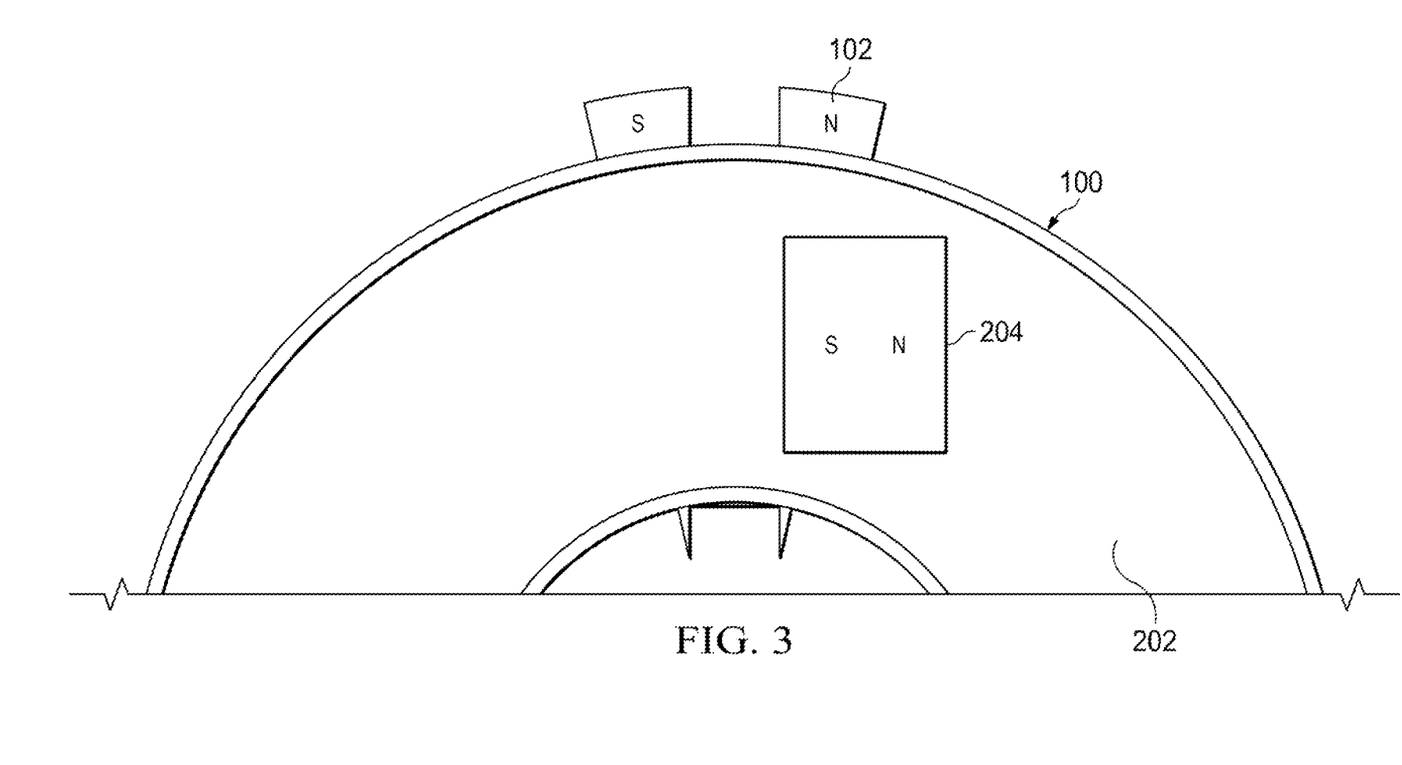
FIG. 3 illustrates a cross-sectional interior view of a portion of the hollow toroidal system having the free-moving magnetic object approaching and interacting with a first one of the electromagnetic coils in an acceleration pattern, in accordance with some embodiments of the present invention.

FIG. 3 illustrates a cross-sectional interior view of a portion of the hollow toroidal system 100 having the free-moving magnetic object 204 approaching and interacting with a first one of the electromagnetic coils 102, in accordance with some embodiments of the present invention. During the acceleration phase, the control system 104 keeps the interacting electromagnetic coil 102 magnetically polarized to attract the free-moving magnetic object 204 when it is approaching the interacting electromagnetic coil 102. This attraction is created by the Lorenz force and provides the free-moving magnetic object 204 with momentum and acceleration to move towards and across it.

One skilled in the art will recognize that there will be an opposite and equal force applied to the interacting electromagnetic coil 102 and thus to the hollow toroidal system 100 at the same time. However, as will be explained below, the force on the hollow toroidal system 100 will be cancelled by the force on other interacting electromagnetic coils 102 positioned at different locations on the hollow toroidal system 100. Accordingly, the pattern of interactions will create only movement of the free-moving magnetic object 204.

Figure 4:
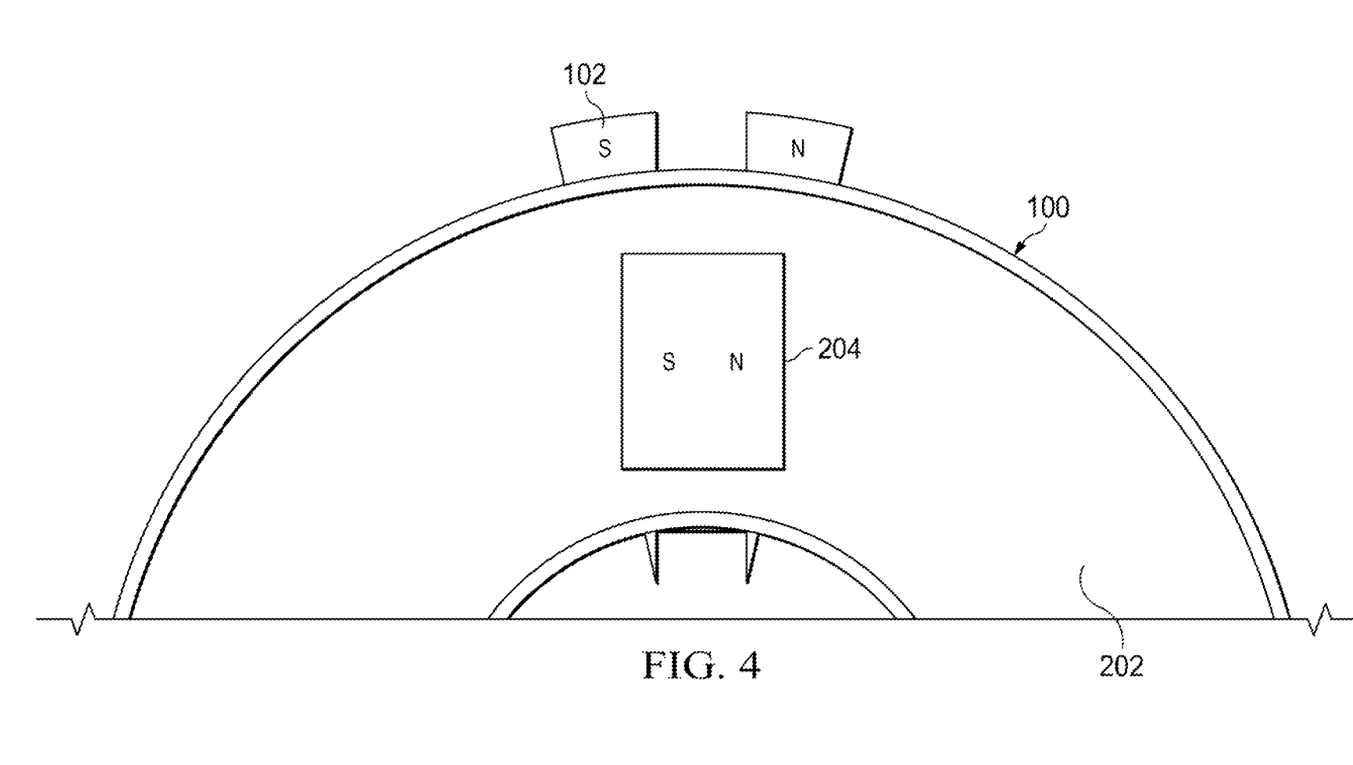
FIG. 4 illustrates a cross-sectional interior view of a portion of the hollow toroidal system having the free-moving magnetic object central to the first one of the electromagnetic coils in an acceleration pattern, in accordance with some embodiments of the present invention.

FIG. 4 illustrates a cross-sectional interior view of a portion of the hollow toroidal system 100 having the free-moving magnetic object 204 central to the interacting electromagnetic coil 102, in accordance with some embodiments of the present invention. When the free-moving magnetic object 204 reaches the middle of the interacting electromagnetic coil 102, if an electric current were continued to be applied to the electromagnetic coil 102, the free-moving magnetic object 204 will be held forcibly in the middle of the interacting electromagnetic coil 102, where the magnetic flux is equal on both sides. Accordingly, in some embodiments, to maximize acceleration and momentum of the free-moving magnetic object 204, the control system 104 may deactivate the current just before or when the free-moving magnetic object 204 has reached this central location.

Figure 5:
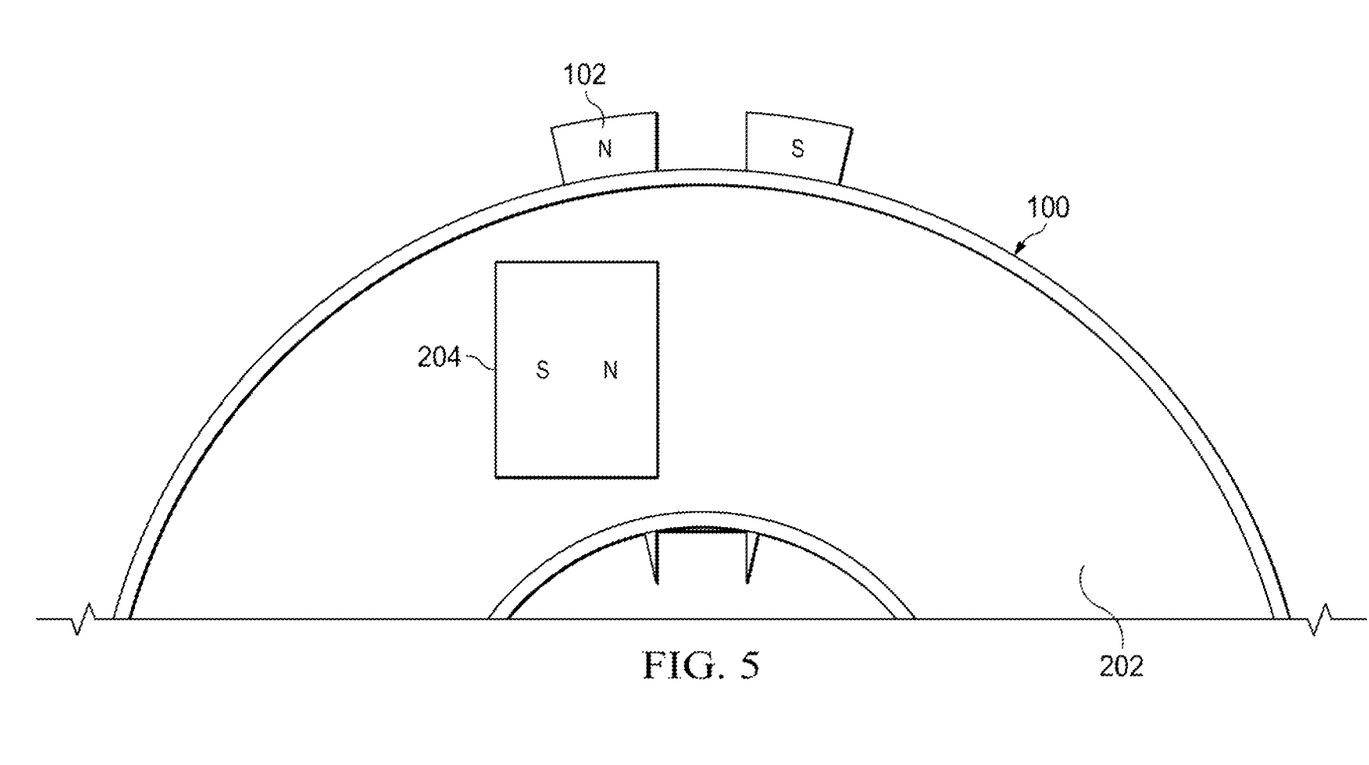
FIG. 5 illustrates a cross-sectional interior view of a portion of the hollow toroidal system having the free-moving magnetic object departing and interacting with the first one of the electromagnetic coils after the electromagnetic coil has reversed polarities in an acceleration pattern, in accordance with some embodiments of the present invention.

FIG. 5 illustrates a cross-sectional interior view of a portion of the hollow toroidal system 100 having the free-moving magnetic object 204 departing and interacting with the interacting electromagnetic coil 102, after the control system 104 has reversed the magnetic polarity of the interacting electromagnetic coil 102, in accordance with some embodiments of the present invention. The reversed magnetic polarity of the interacting electromagnetic coil 102 will create a repelling force between the electromagnetic coil 102 and the free-moving magnetic object 204 to further accelerate the free-moving magnetic object 204. In some embodiments, the magnitude of the reversed magnetic polarity may be opposite of the attractive magnetic polarity, although it need not be.

Figure 6:
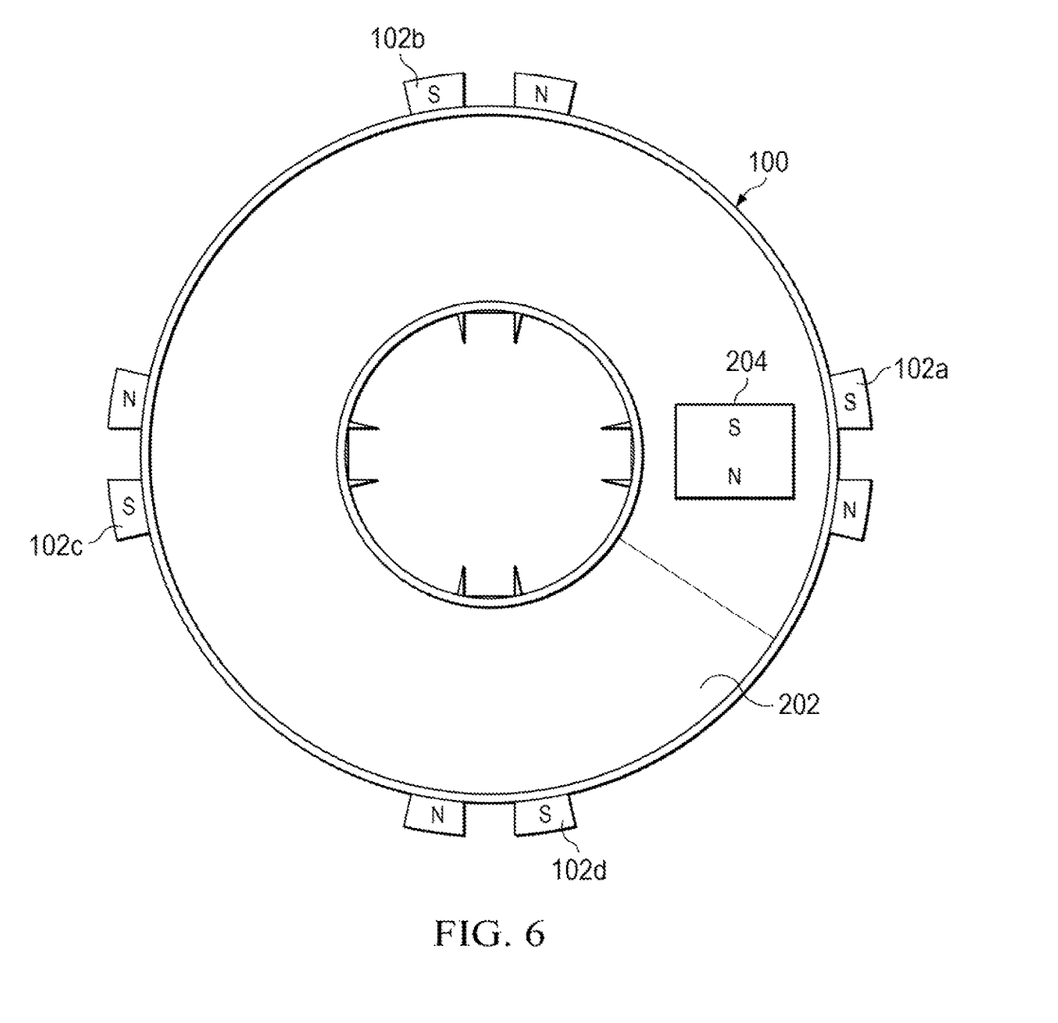
FIG. 6 illustrates a cross-sectional interior view of the hollow toroidal system having the free-moving magnetic object adjacent the one of the electromagnetic coils, in accordance with some embodiments of the present invention.

FIG. 6 illustrates a cross-sectional interior view of the hollow toroidal system 100 having the free-moving magnetic object 204 adjacent one of the electromagnetic coils 102, in accordance with some embodiments of the present invention. As shown, the magnetic polarities of the interacting electromagnetic coil 102 reversed to repel the free-moving magnetic object 204 as it departs the interacting electromagnetic coil 102, thereby continuing to accelerate the free-moving magnetic object 204 during the acceleration phase.

As noted above, the force of the electromagnetic coil 102 on the free-moving magnetic object 204 will impart an opposite and equal force to the interacting electromagnetic coil 102, which would effectively cause a force in the opposite direction of the movement of the free-moving magnetic object 204. The force on the electromagnetic coil 102 would cause a directional force on the hollow toroidal system 100 and a rotational force relative to its center of mass. To offset the directional forces on the hollow toroidal system 100, another electromagnetic coil 102 may be placed at the opposite side of the hollow toroidal system 100. The control system 104 may apply the same current on the opposite electromagnetic coil 102 to cause the same acceleration pattern as occurred at the first electromagnetic coil. This will cancel the directional forces on the hollow toroidal system 100. However, it may not stop the rotational force relative to the center of mass of the hollow toroidal system 100, which is in the same direction.

With continued reference to FIG. 6, in some embodiments, the hollow toroidal system 100 comprises four electromagnetic coils 102a-102d positioned as two opposing pairs (pair 102a/102c and pair 102b/102d). When operating in the same manner, each opposing pair of electromagnetic coils 102 cancels each other's directional forces, e.g., the forces on the x-axis and the y-axis exerted on the hollow toroidal system 100. If all the electromagnetic coils 102a-102d are activated in the same manner as described above to create maximum rotation of the free-moving magnetic object 204, the hollow toroidal system 100 as a whole will not move in any specific direction. The free-moving magnetic object 204 will gain momentum and kinetic energy. The hollow toroidal system 100 may rotate. As described below, different alternatives exist to deal with undesirable rotation.

Figure 7:
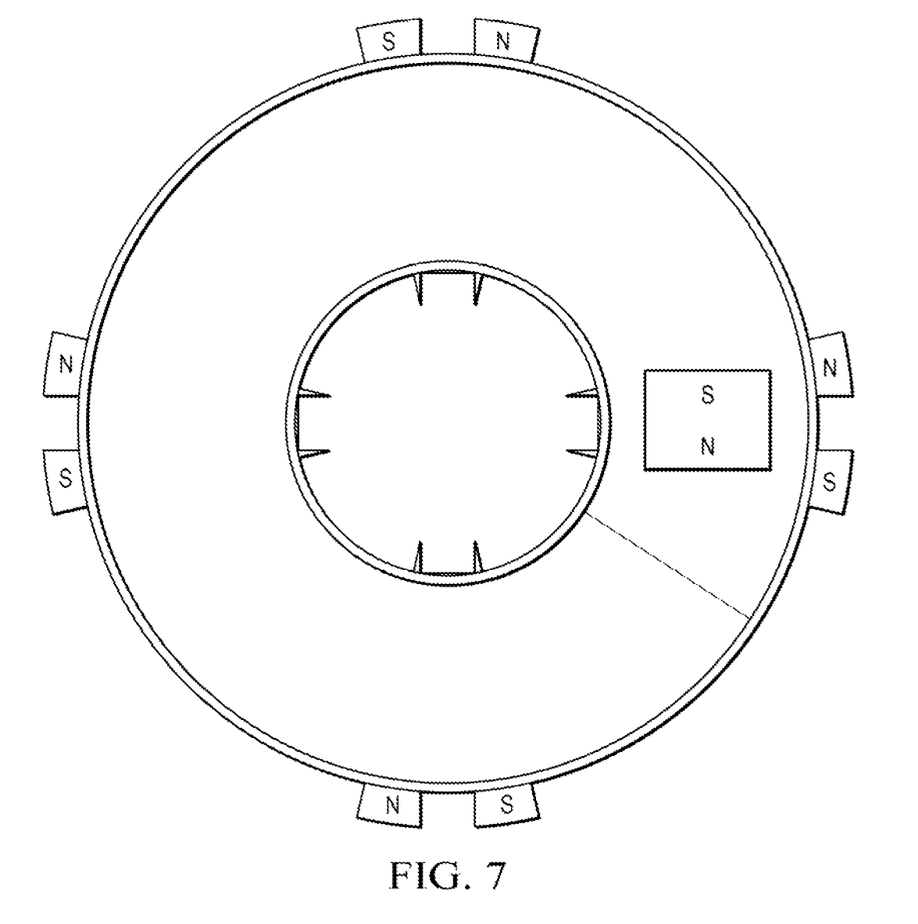
FIG. 7 illustrates a cross-sectional interior view of the hollow toroidal system with one of the electromagnetic coils having reversed polarities in a collision pattern, in accordance with some embodiments of the present invention.

FIG. 7 illustrates a cross-sectional interior view of the hollow toroidal system 100 having one of the electromagnetic coils with reversed magnetic polarities in a collision pattern, in accordance with some embodiments of the present invention.

When the free-moving magnetic object 204 is rotating at a specific velocity and the blocking electromagnetic coil 102 is reverse activated in a blocking pattern, the free-moving magnetic object 204 will be repelled and/or held by the blocking electromagnetic coil 102 with the force pointing to the opposite direction of the movement of the free-moving magnetic object 204. The forces have the same effect on the blocking electromagnetic coil 102 but with the direction of the force in the direction of the movement of the free-moving magnetic object 204 as shown. Since the blocking electromagnetic coil 102 is mechanically connected to the hollow toroidal system 100 and the other electromagnetic coils 102, the hollow toroidal system 100 will receive that directional force. Notably, the blocking electromagnetic coil 102 will provide a directional force in the same direction as its opposing electromagnetic coil 102 operating in an acceleration phase, instead of cancelling the directional force of its opposing electromagnetic coil 102. Accordingly, both electromagnetic coils 102 will cooperatively cause a directional movement of the hollow toroidal system 100. Further, in some embodiments, the other electromagnetic coils 102 can continue to accelerate the free-moving magnetic object 204 without affecting directional movement.

The velocity and momentum the free-moving magnetic object 204 and the system post the "collision" are determined by the momentum equation and are similar to an inelastic collision case. Note that "magnet" below refers to the free-moving magnetic object 204, "toroid" below refers to the toroidal body 106, and "system" refers to the combination of the hollow toroidal body 106 and the free-moving magnetic object 204.

$$m\_magnet * v\_magnet = (m\_magnet + m\_toroid) * v\_system$$

Assuming there is no loss of energy in the collision or due to friction and/or deformation, and that that the conservation of momentum is conserved:

Momentum: $P = m * v1in = m1 * v1out + m2 * v2out$      1)

Kinetic Energy: $Ek = m * v1in^2 / 2$      2)

To simplify the calculation of velocity of the system post one "collision", the hollow toroidal system 100 may be designed where the mass of the free-moving magnetic object 204 is equal to the mass of the hollow toroidal body 106 with the four electromagnetic coils 102a-102d. In an inelastic collision and when the masses are equal, all of the momentum is transferred to the object that get hits.

$$m\_magnet * v\_magnet = (m\_magnet + m\_toroid) * v\_out$$

$$v\_out = m\_magnet * v\_magnet / (m\_magnet + m\_todoid)$$

$$m\_magnet = m\_toroid = m // \text{ done for simplicity here}$$

$$v\_out = v\_magnet / 2$$

The hollow toroidal system 100 will move in a given direction at half of the velocity of the free-moving magnetic object 204 prior to the collision.

To make the hollow toroidal system levitate, overcoming earth gravity, the system 100 needs to create enough collisions per second and have the free-moving magnetic object 204 rotate at a minimum velocity.

For this example, we note g=9.8 m/sec^2, and assume the free-moving magnetic object 204 full rotation time is 1 second. To simplify the calculation, we assume the system need to gain 9.8 meters per second to offset gravity and levitate.

$$Ek = Ep => m * v\_out^2 / 2 = m * g * h$$

$$v\_out^2 = 2 * g * h; \ v\_out = sqrt(2 * g * h)$$

$$v\_magnet = 2 * v\_out = 2 * sqrt(2 * 9.8 * 9.8) = 27.71 \text{ meters/second}$$

and, the needed radius for the toroidal channel 202 with 1 revolution per second would be:

$$circumference = 2 * pi * r => r = circumference / (2 * pi)$$

$$r = 27.71 / (2 * 3.14) = 4.4 \text{ meters}$$

For a smaller engine size, a higher rotational revolution will likely be required, but lower speed as more "collisions" will happen per second.

For example, with 10 revolutions per second, the height needed to gain is 1 meter per collision and the circumference needs to be divided by 10, which result in:

$$v\_magnet = 2 * sqrt(2 * 9.8 * 1) = 8.85 \text{ meters/second}$$

$$r = 8.85 / (2 * 3.14 * 10) = 0.14 \text{ meters} = 14 \text{ cm}$$

The needed electric power needed to drive the magnet is:

$$P = Energy / Time = Volts * Amps$$

Following the example above with 1 revolution per second:

$$v\_magnet = 27.71 \text{ meters/second}$$

With the mass of the magnet is:

$$m\_magnet = 0.5 \text{ kg}$$

$$Ek = \frac{1}{2} m\_magnet * v\_magnet^2 = 0.5 * 0.5 * 27.211 \backslash 2 = 191.96 \text{ Joules}$$

Per unit of time (which in this case is 1 second):

$$P = Ek = 191.96 \text{ Watts}$$

With a power source of 60 volts, the current needed is:

$$I = P / V = 191.96 / 60 = 3.2 \text{ Amps}$$

Figure 8:
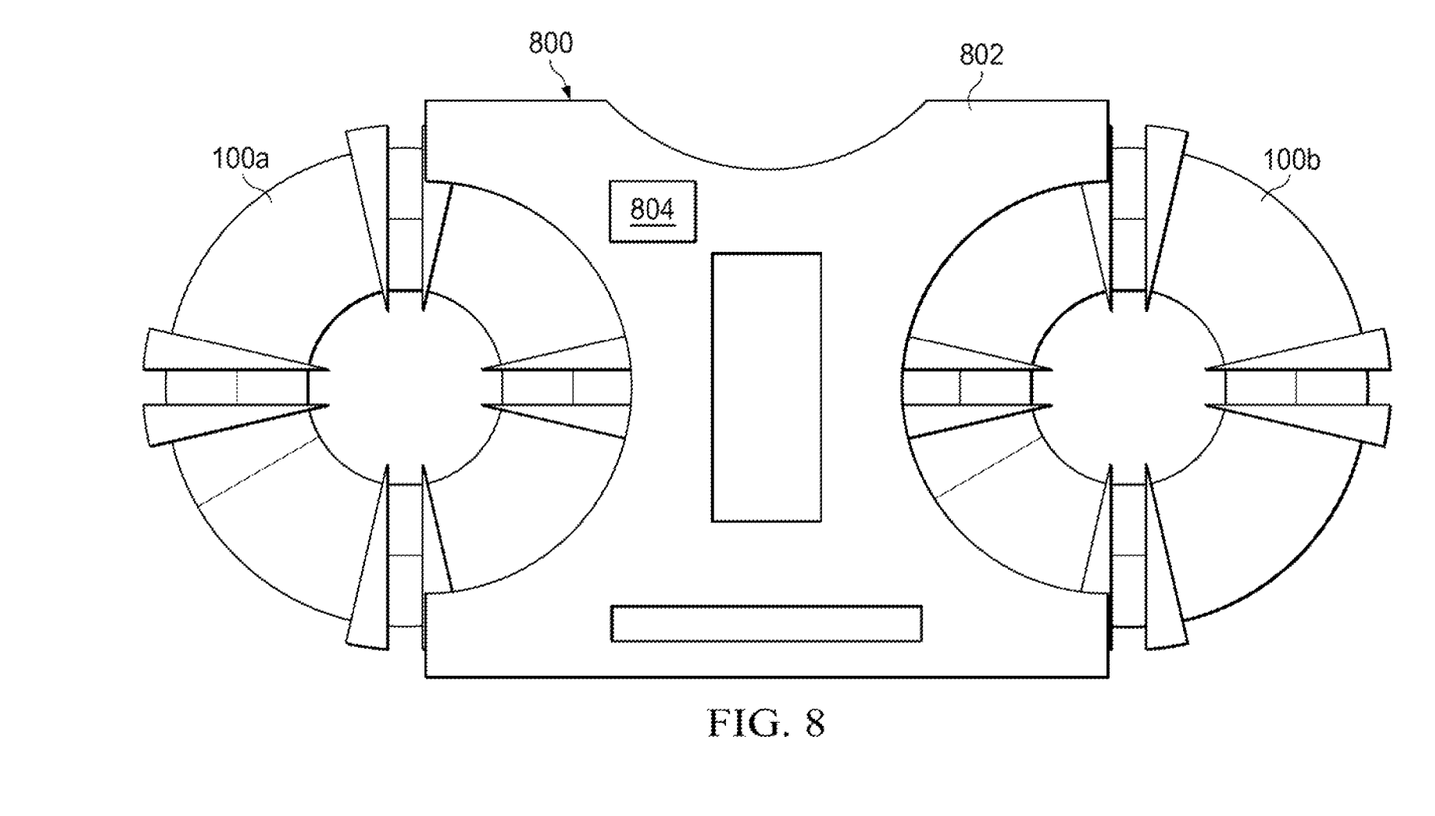
FIG. 8 illustrates an engine comprising two hollow toroidal systems cooperating to form a single machine, in accordance with some embodiments of the present invention.

FIG. 8 illustrates an engine 800 comprising two hollow toroidal systems 100*a* and 100*b* held together by a coupling mechanism 802 and cooperating to form a single machine, in accordance with some embodiments of the present invention.

As stated above, if the force on a blocking electromagnetic coil 102 does not originate at the center of the mass of the hollow toroidal system 100 (e.g., hollow toroidal system 100*a*) or of the vehicle, the system or vehicle will rotate around its center of mass. To offset this rotation movement, a second hollow toroidal system 100 (e.g., hollow toroidal system 100*b*) may be connected and synchronized to create forces in the same direction, time, magnitude and distance from the center of mass. Accordingly, the pair of hollow toroidal systems 100*a* and 100*b* will cancel the rotational forces, and will double directional movement forces.

A control system 804 can control the two hollow toroidal systems 100*a*-100*b* to control movement on all two directions (X and Y directions). The control system 804 may control individual control systems, such as control system 104, which controls each the two hollow toroidal systems 100*a*-100*b*. The control system 804, possibly in combination with the individual control systems 104, can control the pattern of magnetic polarities, activations, deactivations, magnitudes, etc. of each electromagnetic coil 102 on each of the hollow toroidal systems 100*a*-100*b*.

To control the timing and synchronization of the electromagnetic coils 102 in each of the hollow toroidal systems 100*a*-100*b*, a combination of sensors and controllers can be used. For example, HALL effect or photodiodes sensors can be placed near the electromagnetic coils 102 to detect the location of the free-moving magnetic object 204 in each toroidal channel 202. The control system 804 (e.g., a microcontroller) can analyze the sensors data to activate the electric current amplitudes and polarities on the electromagnetic coils 102. To increase the power and current provided to the electromagnetic coils 104, amplifying circuits comprising MOSFET integrated circuits for example can be used to provide high current to the electromagnetic coils 102 based on commands from the control system 804.

In some embodiments, the control system 804 may be controlled by a remote-control interface that provides directional commands. The control system 804 may include location-based devices, gyroscopes, accelerometers, and other sensors to add navigation, stability, and controls to enable human control or automated operation.

Figure 9:
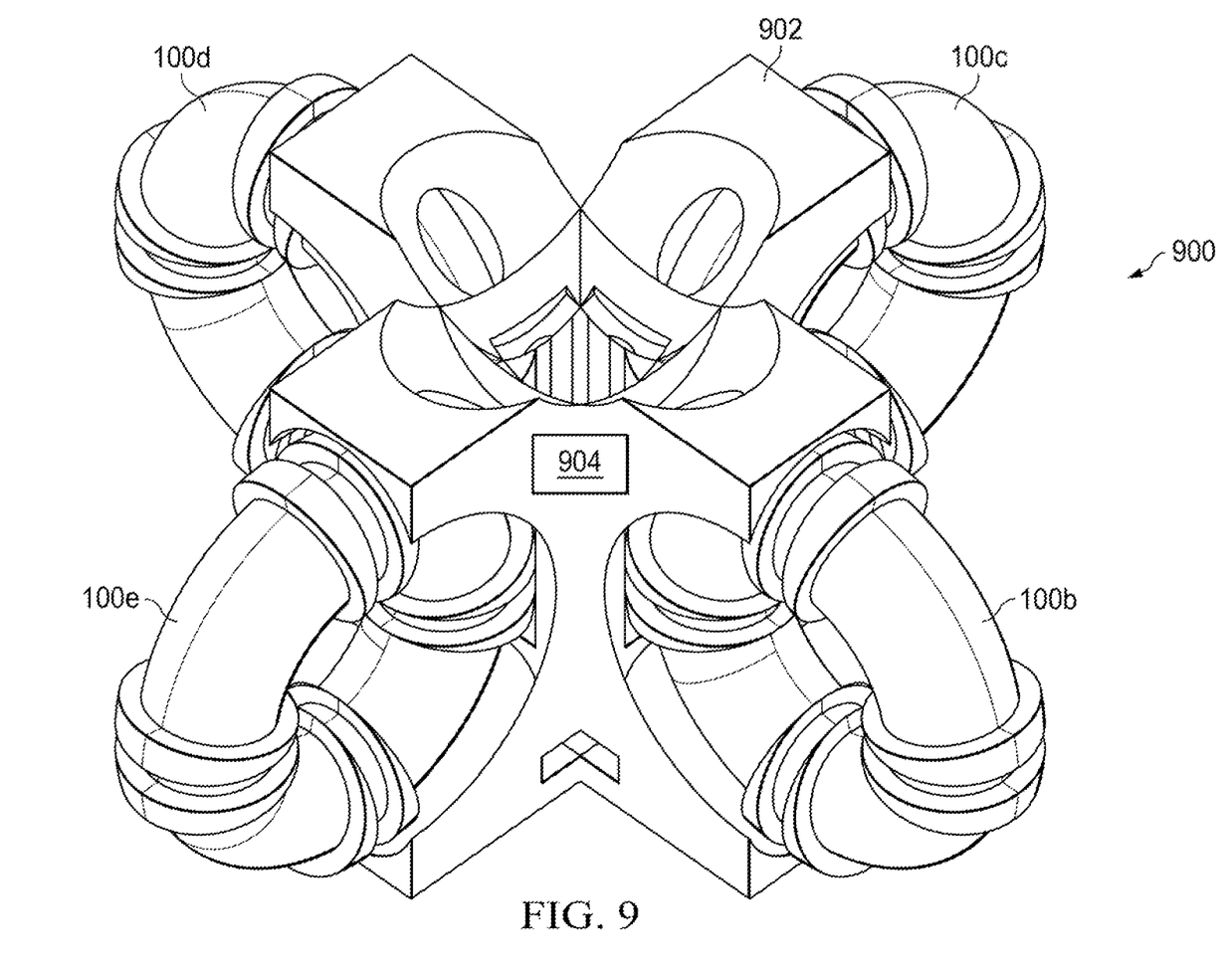
FIG. 9 illustrates an engine comprising four hollow toroidal systems cooperating to form a single machine, in accordance with some embodiments of the present invention.

FIG. 9 illustrates an engine 900 comprising four hollow toroidal systems 100*c*-100*f* held together by a coupling mechanism 902 and cooperating to form a single machine, in accordance with some embodiments of the present invention.

A control system 904 can control the four hollow toroidal systems 100*c*-100*f* to control movement on all three directions (X, Y, and Z directions). The control system 904 may control individual control systems, such as control system 104, which controls each the four hollow toroidal systems 100*c*-100*f*. The control system 904, possibly in combination with the individual control systems 104, can control the pattern of magnetic polarities, activations, deactivations, magnitudes, etc. of each electromagnetic coil 102 on each of the hollow toroidal systems 100*c*-100*f*.

Similar to some embodiments discussed with reference to FIG. 8, to control the timing and synchronization of the electromagnetic coils 102 in each of the hollow toroidal systems 100*c*-100*f*, a combination of sensors and controllers can be used. For example, HALL effect or photodiodes sensors can be placed near the electromagnetic coils 102 to detect the location of the free-moving magnetic object 204 in each toroidal channel 202. The control system 904 (e.g., a microcontroller) can analyze the sensors data to activate the electric current amplitudes and polarities on the electromagnetic coils 102. To increase the power and current provided to the electromagnetic coils 104, amplifying circuits comprising MOSFET integrated circuits for example can be used to provide high current to the electromagnetic coils 102 based on commands from the control system 904.

Similar to some embodiments discussed with reference to FIG. 8, the control system 904 may be controlled by a remote-control interface that provides directional commands. The control system 904 may include location-based devices, gyroscopes, accelerometers, and other sensors to add navigation, stability, and controls to enable human control or automated operation.

Different designs for positioning one or more hollow toroidal systems 100 may be used, e.g., when only forward/backward directional movement is needed (e.g., as on a monorail), omni-directional movement on a surface (e.g., as with a car) is needed, and/or omni-directional movement in free space (e.g., as with a spacecraft or submarine) is needed.

Some unique aspects of different embodiments of the solution may include the following:

1. A system comprises multiple parts and objects. Some of the parts and objects may be free moving within the system at times and mechanically connected to the system at other times.
2. Based on Newton's second law of motion, a force may be created on a free-moving object within the system providing it acceleration and kinetic energy.
3. Based on Newton's third law, when two bodies interact, the bodies apply forces to one another that are equal in magnitude and opposite in direction. As force is applied on the free-moving object, an opposite and equal force is applied on the system. To overcome the opposite forces and have the whole system move in a specific direction, use of multiple forces are applied in opposite directions within the system, which cancel the total forces on the system, but not on the free object.
4. The location of the center of mass of the system may be different than the location of the center of the mass of the free-moving object. This difference allows canceling the total forces on the system while allowing the free object to gain kinetic energy.
5. To create directional movement of the system, a periodic force is applied in the direction of the desired movement. That force may be applied by momentarily connecting the free-moving object to the system. This momentary connection acts as a collision that transfers the free object momentum and kinetic energy to the system. Based on the laws of momentum conservation, the system will gain momentum on the direction of the free object momentum at the time of the collision.
6. Once the collision happens, and the energy and momentum of the free object has been transferred to the system (partly or completely), the free object is disconnected from the system and allowed to move freely again.
7. These collisions and transfer of kinetic energy of the free-moving object to the system reduces the kinetic energy of the free-moving object. To create repeating and continuous movement of the system, the free objects need to be repeatably accelerated by the system as describe above to gain kinetic energy for the next collisions with the system.
8. The free-moving object can be from sizes of atomic particles to large scale mass to drive cargo and people.

9. The free-moving object can be made from various materials, for example neodymium magnets, iron, steel, plastic, etc.
10. The system can include more than one free-moving object per system, to increase the system velocity, stability, efficiency, etc.
11. The acceleration of the free-moving object can be done in multiple ways, for example, via friction using another engine that spins and via friction transfer the energy to the free-moving engine. Another example is using electromagnetic force using coils and using magnetic material in the free-moving object and leveraging Lorentz force.
12. The free-moving object(s) can move in a circular path within the system or in any path that will cause it to obtain energy in one direction and transfer that energy back to the system in another direction. Another path example would be an oval or FIG. 8 shape.

The engine can be used in various applications. In general, this engine can replace engines based on combustion, electricity, steam, ions, propellent/chemical based (rockets), etc. for purposes of mechanical movement, and enable new applications that were not been able to be built due to the constrains of existing technology.

Car/truck/train examples: The engine can be used on a car/truck/train type of vehicle. In this case, a vehicle with wheels may be equipped with an engine placed horizontally, creating forward or reverse movement and directional control by steering the wheels on the surface (roads). In such applications, the engine need not transfer energy to the wheels. The wheels will spin due to the vehicle movement. There could be one or more engines per vehicle to allow movement in multiple directions, and to increase the speed or efficiency of the vehicle.

Submarine example: In an under-water application, one or more engines can be placed on a submarine vehicle. The one or more engines may be controlled to create movement in multiple directions, including forward, backward, sideways, upwards, downwards or any combination of them.

Aircraft example: In an aircraft application, one or more engines can be placed on an aircraft to allow roll, pitch, and yaw. The one or more can be placed vertically to create upward/downward movement and some can be placed or moved horizontally or in between to allow pitch and yaw. The aircraft can be in similar shape to airplanes with wings and leverage lift, can be in similar shape to helicopter, drone, or any other body shape without wings and without the need for lift (physical meaning).

Spacecraft example: One or more engines can be place on a spacecraft to drive three-dimensional movement in space. These engines can allow takeoff from ground to space as the engine is capable in operating in any environment. With sufficient power, the engines can run for a long periods of time and create high velocity of the spacecraft to allow spacecraft to travel to any place in the solar system and even beyond, going interstellar in higher speeds and greater distances than any other engine that exist today. Using battery, nuclear or fusion power, a spacecraft equipped with one or more engines can travel long distances and much faster than existing engines, because there is no need to carry fuel to be used as a propellent and because it is not dependent on an ion source.

Figure 10:
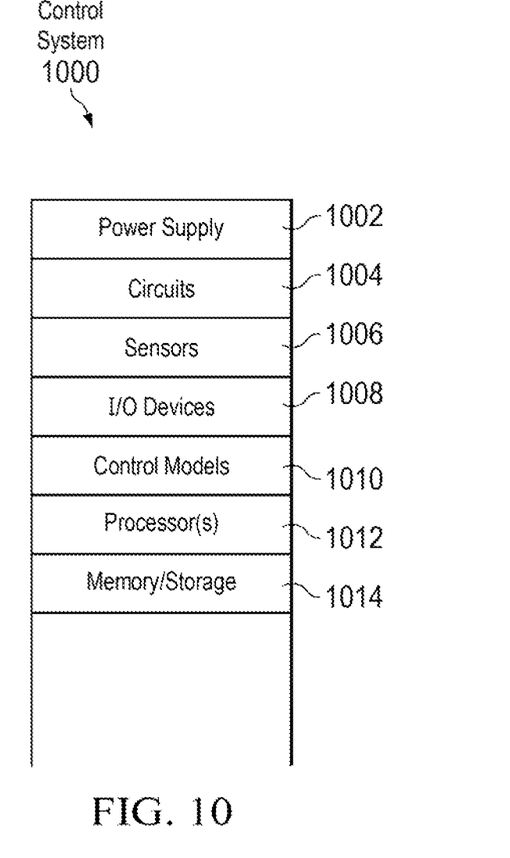
FIG. 10 is a block diagram illustrating the control system, in accordance with some embodiments of the present invention.

FIG. 10 is a block diagram illustrating details of a control system 1000, of which control system 104, 804 or 904 may be an instance. Control system 1000 includes a power supply 1002, circuits 1004, sensors 1006, input/output devices 1008, control models 1010, one or more processors 1012 and memory/storage 1014.

The power supply 1002 is configured to supply the power needed for the respective hollow toroidal systems 100, 800, 900. The power supply 1002 may include a battery, solar cells, or other power supply.

The circuits 1002 includes circuitry to transfer the desired voltages and/or currents to the electromagnetic coils 102.

The sensors 1006 may include HALL effect or photodiodes sensors can be placed near the electromagnetic coils 102 to detect the location of the free-moving magnetic object 204 in each toroidal channel 202. The sensors 1006 may include location-based devices (e.g., a global positioning system), gyroscopes, accelerometers, and other sensors to add navigation, stability, and controls to enable human control or automated operation.

The input/output devices 1008 may include navigational control systems, guidance control systems, speed control systems, remote control systems, steering wheels, throttles, joysticks, pedals, automated systems, etc. Other input/output device 1008 may include keyboards, mice, data ports, network communication systems, etc.

Control models 1010 may include hardware, software and/or firmware configured to translate input signals received from the input/output devices 1008 and sensor signals from the sensors 1006 to control signals to be transferred to various components, including to the electromagnetic coils 102 of the hollow toroidal systems 100, 800, 900. The control models 1010 include the necessary models for controlling the acceleration phase and energy transfer phases to effect directional movement of the vehicle.

The one or more processors 1012 may include hardware, software and/or firmware configured to process the control models to calculate control signal instructions and thereby provide the input signals to generate the control signals.

The memory/storage 1014 may include hardware, software and/or firmware to store the control models 1010, one or more operating systems, one or more applications, one or more drivers, etc., which may be controlled by the one or more processors 1012. One skilled in the art will recognize that, although the memory/storage 1012 can be parts of the same unit, distributed units, virtual memory, etc. The term "memory" herein is intended to cover all data storage media whether permanent or temporary.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:
1. A system, comprising:
a hollow body forming a closed loop channel;
one or more electromagnetic coils on the hollow body;
a free-moving magnetic object in the closed loop channel; and
a control system configured to control the one or more electromagnetic coils to cause the free-moving magnetic object to rotate within the closed loop channel during an acceleration phase, the control system configured to control an interacting electromagnetic coil of the one or more electromagnetic coils during the acceleration phase to attract the free-moving magnetic object as the free-moving magnetic object is approaching the interacting electromagnetic coil and/or to repel the free-moving magnetic object as the free-moving magnetic object is departing the interacting electromagnetic coil, the control system further configured to cause one or more magnetic collisions with at least one of the one or more electromagnetic coils during an energy transfer phase, the one or more magnetic collisions causing a directional movement of the system.

2. The system of claim 1, wherein the closed loop channel is toroidal.

3. The system of claim 1, wherein the hollow body is toroidal.

4. The system of claim 1, wherein the one or more electromagnetic coils includes four electromagnetic coils equally spaced apart.

5. The system of claim 1, wherein the control system is configured to control the interacting electromagnetic coil to deactivate when the free-moving magnetic object is at or almost at the center of the interacting electromagnetic coil.

6. The system of claim 1, wherein the control system is configured to control an interacting electromagnetic coil of the one or more electromagnetic coils during the collision phase to repel the free-moving magnetic object as the free-moving magnetic object is approaching the interacting electromagnetic coil and/or to attract the free-moving magnetic object as the free-moving magnetic object is departing the interacting electromagnetic coil.

7. The system of claim 6, wherein the control system is configured not to deactivate the interacting electromagnetic coil when the free-moving magnetic object is at or almost at the center of the interacting electromagnetic coil.

8. The system of claim 1, further comprising a second free-moving magnetic object.

9. The system of claim 1, further comprising a power source that is disconnected from the free-moving magnetic object.

10. A vehicle, comprising:
a first system, including:
a first hollow body forming a first closed loop channel;
one or more first electromagnetic coils on the first hollow body; and
a first free-moving magnetic object in the first closed loop channel;
a second system including:
a second hollow body forming a second closed loop channel;
one or more second electromagnetic coils on the second hollow body; and
a second free-moving magnetic object in the closed loop second channel; and
a control system configured to control the one or more first electromagnetic coils to cause the first free-moving magnetic object to rotate within the first closed loop channel during a first acceleration phase and to cause one or more first magnetic collisions with at least one of the one or more first electromagnetic coils during a first energy transfer phase, the one or more first magnetic collisions causing a first directional movement, the control system further configured to control the one or more second electromagnetic coils to cause the second free-moving magnetic object to rotate within the second closed loop channel during a second acceleration phase and to cause one or more second magnetic collisions with at least one of the one or more second electromagnetic coils during a second energy transfer phase, the one or more second magnetic collisions causing a second directional movement, vehicle movement being based on the first directional movement and the second directional movement.

11. The vehicle of claim 10, wherein the vehicle is configured to move in one dimension.

12. The vehicle of claim 10, wherein the vehicle is configured to move in two dimensions on a surface.

13. The vehicle of claim 10, wherein the vehicle is configured to move in three dimensions.

14. The vehicle of claim 10, wherein each of the first closed loop channel and the second closed loop channel is toroidal.

15. The vehicle of claim 10, wherein the one or more first electromagnetic coils includes four first electromagnetic coils equally spaced apart, and wherein the one or more second electromagnetic coils includes four second electromagnetic coils equally spaced apart.

16. The vehicle of claim 10, wherein the control system is configured to control a first interacting electromagnetic coil of the one or more first electromagnetic coils during the first acceleration phase to attract the first free-moving magnetic object as the first free-moving magnetic object is approaching the first interacting electromagnetic coil and/or to repel the first free-moving magnetic object as the first free-moving magnetic object is departing the first interacting electromagnetic coil, and wherein the control system is configured to control a second interacting electromagnetic coil of the one or more second electromagnetic coils during the second acceleration phase to attract the second free-moving magnetic object as the second free-moving magnetic object is approaching the second interacting electromagnetic coil and/or to repel the second free-moving magnetic object as the second free-moving magnetic object is departing the second interacting electromagnetic coil.

17. The vehicle of claim 10, wherein the control system is configured to control a first interacting electromagnetic coil of the one or more first electromagnetic coils during the first collision phase to repel the first free-moving magnetic object as the first free-moving magnetic object is approaching the first interacting electromagnetic coil and/or to attract the first free-moving magnetic object as the first free-moving magnetic object is departing the first interacting electromagnetic coil, and wherein the control system is configured to control a second interacting electromagnetic coil of the one or more second electromagnetic coils during the second collision phase to repel the second free-moving magnetic object as the second free-moving magnetic object is approaching the second interacting electromagnetic coil and/or to attract the second free-moving magnetic object as the second free-moving magnetic object is departing the second interacting electromagnetic coil.

18. The vehicle of claim 10, wherein the one or more first magnetic collisions further causes a first rotational movement, the one or more second magnetic collisions further causes a second rotational movement, and the second rotational movement substantially cancels the first rotational movement.

19. The vehicle of claim 10, further comprising a power source that is disconnected from the first free-moving magnetic object and from the second free-moving magnetic object.

* * * * *